United States Patent
Yamashita (10) Patent No.: US 9,932,928 B2
(45) Date of Patent: Apr. 3, 2018

(54) PISTON FOR INTERNAL COMBUSTION ENGINE

(71) Applicant: TOYOTA JIDOSHA KABUSHIKI KAISHA, Toyota-shi, Aichi-ken (JP)

(72) Inventor: Hideo Yamashita, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/129,512

(22) PCT Filed: May 8, 2015

(86) PCT No.: PCT/JP2015/002355
§ 371 (c)(1),
(2) Date: Sep. 27, 2016

(87) PCT Pub. No.: WO2015/177980
PCT Pub. Date: Nov. 26, 2015

(65) Prior Publication Data
US 2017/0122250 A1    May 4, 2017

(30) Foreign Application Priority Data
May 23, 2014   (JP) .................. 2014-107380

(51) Int. Cl.
*F02F 3/12* (2006.01)
*F02B 23/06* (2006.01)

(52) U.S. Cl.
CPC ............ *F02F 3/12* (2013.01); *F02B 23/0639* (2013.01); *F02B 2023/0609* (2013.01)

(58) Field of Classification Search
CPC .... F02F 3/12; F02F 3/10; F02F 3/0084; F02F 3/00; F02F 3/02; F02F 7/0085; F05C 2203/0869; F05C 2253/12; F05C 2201/021; F05C 2201/903; F05C 2203/06; F05C 2203/0886
See application file for complete search history.

(56) References Cited

U.S. PATENT DOCUMENTS

| | | |
|---|---|---|
| 5,469,777 A | 11/1995 | Rao et al. |
| 7,066,132 B1 | 6/2006 | Verbrugge et al. |
| 9,186,866 B2 * | 11/2015 | Merrill .................. B22F 5/009 |

(Continued)

FOREIGN PATENT DOCUMENTS

| | | | |
|---|---|---|---|
| JP | 59041624 A * | 3/1984 | ............. F02B 23/00 |
| JP | S59-039142 U | 3/1984 | |

(Continued)

OTHER PUBLICATIONS

Nov. 28, 2017 Office action in related U.S. Appl. No. 15/070,347.

*Primary Examiner* — Long T Tran
(74) *Attorney, Agent, or Firm* — Andrews Kurth Kenyon LLP (57) ABSTRACT

On a piston top surface, a cavity and two valve recesses are formed. On the piston top surface, a first heat insulating film is formed. However, on edge portions, a second heat insulating film different from the first heat insulating film is formed. The second heat insulating film is formed along the edge portions. The first heat insulating film is composed of porous alumina and a sealer. The second heat insulating film is composed of only porous alumina.

5 Claims, 7 Drawing Sheets

(56) References Cited

U.S. PATENT DOCUMENTS

| | | | |
|---|---|---|---|
| 2007/0218303 A1* | 9/2007 | Ogawa | C25D 11/06 |
| | | | 428/472.2 |
| 2009/0260594 A1* | 10/2009 | Hara | B23P 15/10 |
| | | | 123/193.6 |
| 2012/0042859 A1 | 2/2012 | Sakai | |
| 2013/0327289 A1* | 12/2013 | Hiratsuka | F01L 3/04 |
| | | | 123/193.6 |
| 2014/0202386 A1 | 7/2014 | Taga et al. | |
| 2014/0290617 A1 | 10/2014 | Tomita et al. | |
| 2015/0144093 A1 | 5/2015 | Harada et al. | |
| 2015/0204268 A1* | 7/2015 | Sasaki | B22D 25/02 |
| | | | 123/193.6 |
| 2016/0273483 A1 | 9/2016 | Yamashita | |

FOREIGN PATENT DOCUMENTS

| | | | | |
|---|---|---|---|---|
| JP | 60030451 A | * | 2/1985 | F02B 77/02 |
| JP | 02137662 A | * | 5/1990 | |
| JP | H05-079564 A | | 3/1993 | |
| JP | H06-081711 A | | 3/1994 | |
| JP | H10-102296 A | | 4/1998 | |
| JP | H11-280545 A | | 10/1999 | |
| JP | 2002-332571 A | | 11/2002 | |
| JP | 2008-111367 A | | 5/2008 | |
| JP | 2009-243355 A | | 10/2009 | |
| JP | 2010-249008 A | | 11/2010 | |
| JP | 2012-072745 A | | 4/2012 | |
| JP | 2013-014830 A | | 1/2013 | |
| JP | 2014-020300 A | | 2/2014 | |
| JP | 2014-160790 A | | 9/2014 | |

* cited by examiner

PISTON FOR INTERNAL COMBUSTION ENGINE

CROSS-REFERENCE TO RELATED APPLICATIONS

This is a national phase application based on the PCT International Patent Application No. PCT/JP2015/002355 filed May 8, 2015, claiming priority to Japanese Patent Application No. 2014-107380 filed May 23, 2014, the entire contents of both of which are incorporated herein by reference.

TECHNICAL FIELD

The present invention relates to a piston for an internal combustion engine, and more particularly relates to a piston for an internal combustion engine in which a heat insulating film is formed on a top surface.

BACKGROUND ART

Conventionally, a piston for an internal combustion engine in which a heat insulating film is formed on an entire top surface has been disclosed in Patent Literature 1, for example. The heat insulating film is composed of a porous layer that is obtained by anodizing a surface of a piston base material of an aluminum alloy, and a coating layer that is provided on the porous layer and is obtained by plasma spraying of $Y_2O_3$-stabilized $ZrO_2$ powder. The coating layer is provided to close pores of the porous layer, and $Y_2O_3$-stabilized $ZrO_2$ composing the coating layer has a lower heat conductivity than the piston base material. If the piston on which the heat insulating film like this is formed is applied to an internal combustion engine, the heat insulating property in the combustion chamber of the internal combustion engine is enhanced and cooling loss can be reduced.

CITATION LIST

Patent Literature

PTL 1: Japanese Patent Laid-Open No. 2012-72745
PTL 2: Japanese Patent Laid-Open No. 2008-111367

SUMMARY OF INVENTION

Technical Problem

The aforementioned porous layer is what is called anodized aluminum, and is known to have a lower thermal conductivity and a lower heat capacity than not only the piston base material but also the conventional ceramics heat insulating materials. Accordingly, the heat insulating film in Patent Literature 1 which is composed of the combination of the porous layer and the coating layer has a low thermal conductivity and a low heat capacity as the entire film, and if the piston on which the heat insulating film like this is formed on the whole of the piston top surface is applied to an internal combustion engine, followability of a piston top surface temperature to the gas temperature in the combustion chamber can be improved. However, according to the knowledge of the present inventor, it has become clear that when the heat insulating film like this is formed on the entire piston top surface, there arises a new problem that knocking easily occurs.

The invention is made to solve the problem as described above. That is to say, an object of the invention is to provide a piston capable of favorably restraining occurrence of knocking while ensuring followability of a piston top surface temperature to a gas temperature in a combustion chamber when applied to an internal combustion engine.

Solution to Problem

To achieve the above-described object, a first invention is a piston for an internal combustion engine comprising a piston main body, a cavity formed on a top surface of the piston main body, and a heat insulating film that is formed on the top surface, and has a lower thermal conductivity and a lower heat capacity per unit volume than an aluminum alloy that is used as a base material of the piston main body,
wherein the heat insulating film comprises a low heat insulation film that is formed on a cavity edge portion forming a boundary between the cavity and the top surface and is composed of alumina having a number of pores that are opened to the top surface, and a high heat insulation film that is formed on a surface inward from the cavity edge portion and a surface surrounding the cavity edge portion, and is composed of alumina having a number of pores that are opened to the top surface and a sealer that is provided to cover the openings of the number of pores.

A second invention is the piston for the internal combustion engine according to the first invention,
wherein the low heat insulation film is formed on the piston edge portion forming an edge of the top surface, and
between the piston edge portion and the cavity edge portion, a surface surrounding the cavity edge portion is formed A third invention is the piston for the internal combustion engine according to the first or second invention, wherein an edge angle θ of the cavity edge portion satisfies 0°<θ≤90°.

A fourth invention is the piston for the internal combustion engine according to any one of the first to the third inventions, further comprising:
a valve recess that is formed in the surface surrounding the cavity edge portion,
wherein the low heat insulation film is formed on a valve recess edge portion corresponding to a circular arc portion in a boundary between the surface surrounding the cavity edge portion and the valve recess, and
the high heat insulation film is formed on a surface inward from the valve recess edge portion.

A fifth invention is the piston for the internal combustion engine according to the fourth invention, wherein an edge angle θ of the valve recess edge portion satisfies 0°<θ≤90°.

Advantageous Effects of Invention

According to the knowledge of the present inventor, it has become clear that if the heat insulating film which has a lower thermal conductivity and a lower heat capacity per unit volume than the aluminum alloy which is the piston base material is provided on the entire piston top surface on which a cavity is formed, a heat spot is generated in the cavity edge portion which forms the boundary between the cavity and the piston top surface, and knocking easily occurs. The first invention is made based on the knowledge. That is to say, according to the first invention, the heat generated in the combustion chamber is enable to escape easily to the piston base material side by the structure of the low heat insulation film while followability of the piston top surface temperature to the gas temperature in the combustion chamber is ensured by the low heat insulation film and the high heat insulation film, and therefore, generation of a heat spot in the cavity edge portion can be restrained.

A problem of generation of a heat spot can also arise in the piston edge portion which forms the edge of the piston top surface. In this regard, according to the second invention, the heat generated in the combustion chamber is enabled to escape easily to the piston base material side by the structure of the low heat insulation film formed on the piston edge portion, and therefore, generation of a heat spot in the piston edge portion can be restrained.

When the edge angle θ of the cavity edge portion satisfies 0°<θ≤90°, the problem of generation of a heat spot tends to arise easily in the cavity edge portion. In this regard, according to the third invention, generation a heat spot in the cavity edge portion can be favorably restrained.

When the valve recess is formed in the surface surrounding the cavity edge portion, the problem of generation of a heat spot can arise in the valve recess edge portion corresponding to the circular arc portion in the boundary between the surface surrounding the cavity edge portion and the valve recess. In this regard, according to the fourth invention, the heat generated in the combustion chamber is enabled to escape easily to the piston base material side by the structure of the low heat insulation film formed on the valve recess edge portion, and therefore, even when the valve recess is formed, an effect similar to the effect of the first invention also can be obtained.

When the edge angle θ of the valve recess edge portion satisfies 0°<θ≤90°, the problem of generation of a heat spot tends to arise easily in the cavity edge portion. In this regard, according to the fifth invention, generation of a heat spot in the cavity edge portion can be favorably restrained.

DESCRIPTION OF EMBODIMENT

Hereinafter, an embodiment of the present invention will be described with reference to the drawings. Note that common elements in the respective drawings are assigned with the same reference signs and redundant explanation will be omitted. Further, the present invention is not limited by the following embodiment.

Figure 1:
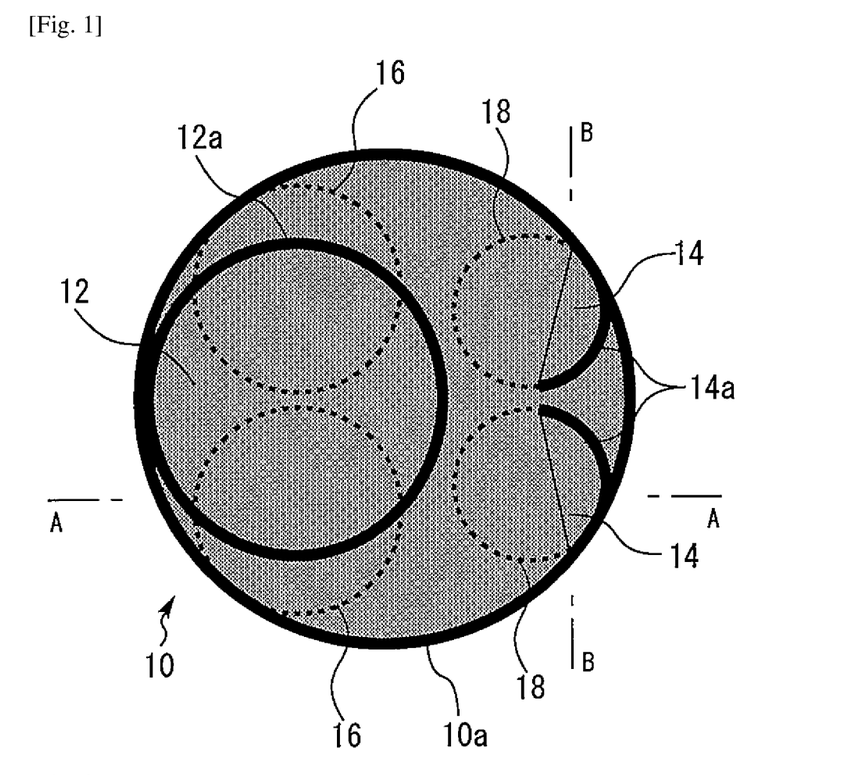
FIG. 1 is a schematic view of a top surface of a piston for an internal combustion engine of the present embodiment.

[Configuration of piston] FIG. 1 is a schematic view of a top surface of a piston for an internal combustion engine of the present embodiment. As shown in FIG. 1, a cavity 12 and two valve recesses 14 are formed on a piston top surface 10. The cavity 12 is provided to be recessed in the piston top surface 10 with an objective of guiding fuel that is injected toward the piston top surface 10 to an ignition plug (not illustrated) side. The valve recess 14 is provided to be recessed in the piston top surface 10 with an objective of avoiding interference with an exhaust valve (not illustrated). A dashed line 16 shown in the drawing shows a projection line of an intake valve, and a dashed line 18 shows a projection line of an exhaust valve. In a boundary between the piston top surface 10 and the cavity 12, a ring-shaped edge portion 12a is formed. A boundary between the piston top surface 10 and the valve recess 14 is formed into a half-moon shape, and an edge portion 14a is formed on a circular arc portion along the dashed line 18. A part of the edge portion 14a connects to an edge portion 10a that forms an edge of the piston top surface 10.

A first heat insulating film is formed on the piston top surface 10. However, on the edge portions 10a, 12a and 14a, a second heat insulating film that is different from the first heat insulating film is formed. The second heat insulating film is formed along the edge portions 10a, 12a and 14a. Note that when the edge portions 10a, 12a and 14a do not need to be distinguished from one another in the following explanation, the edge portions 10a, 12a and 14a are sometimes generically called "edge portions".

Figure 2:
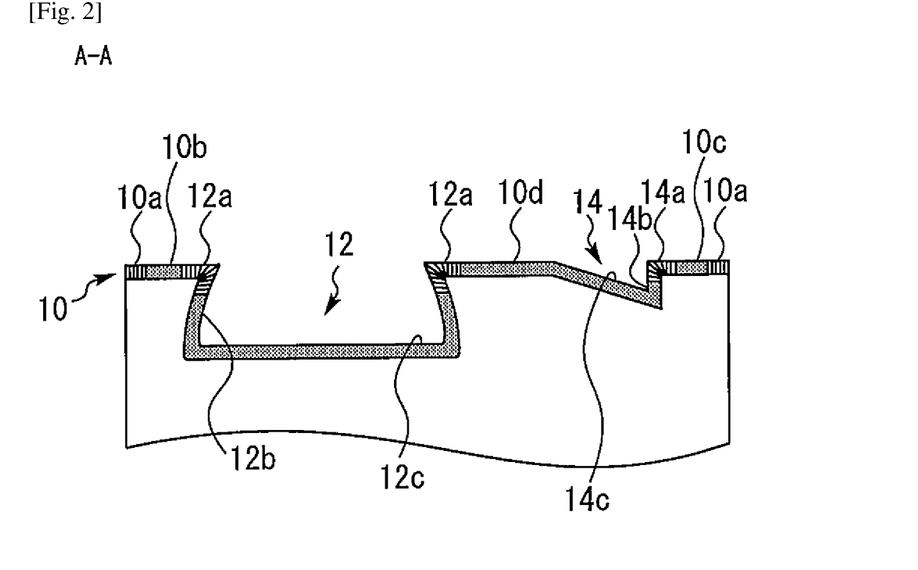
FIG. 2 is a sectional view taken along line A-A in FIG. 1.

A positional relation of the first heat insulating film and the second heat insulating film will be described with reference to FIG. 2 to FIG. 6. FIG. 2 is a sectional view taken along line A-A in FIG. 1. The first heat insulating film is formed on an interior constituting surface (more specifically, a cavity side surface 12b and a cavity bottom surface 12c) of the cavity 12 except for the edge portion 12a shown in FIG. 2. The first heat insulating film is also formed on an interior constituting surface (more specifically, a valve recess side surface 14b and a valve recess bottom surface 14c) of the valve recess 14 except for the edge portion 14a. The first heat insulating film is also formed on a piston top surface 10b between the edge portion 10a and the edge portion 12a, a piston top surface 10c between the edge portion 10a and the edge portion 14a, and a piston top surface 10d between the edge portion 12a and the valve recess bottom surface 14c.

Figure 3:
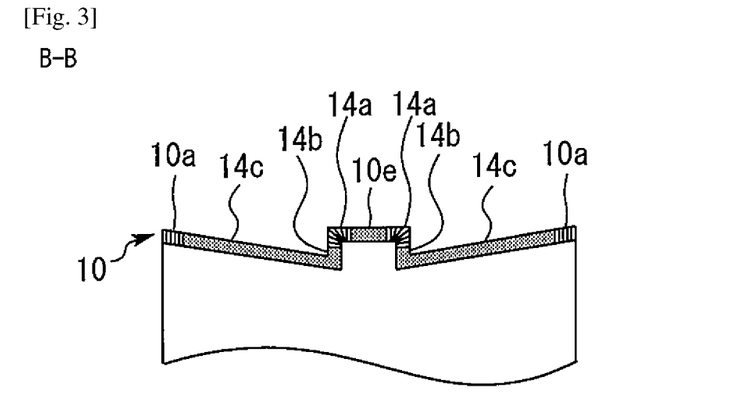
FIG. 3 is a sectional view taken along line B-B in FIG. 1.

FIG. 3 is a sectional view taken along line B-B in FIG. 1. The first heat insulating film is formed on an interior constituting surface of the valve recess 14 between the edge portion 10a and the edge portion 14a shown in FIG. 3, that is, on the valve recess side surface 14b and the valve recess bottom surface 14c. The first heat insulating film is also formed on a piston top surface 10e between the two edge portions 14a.

Figure 4:
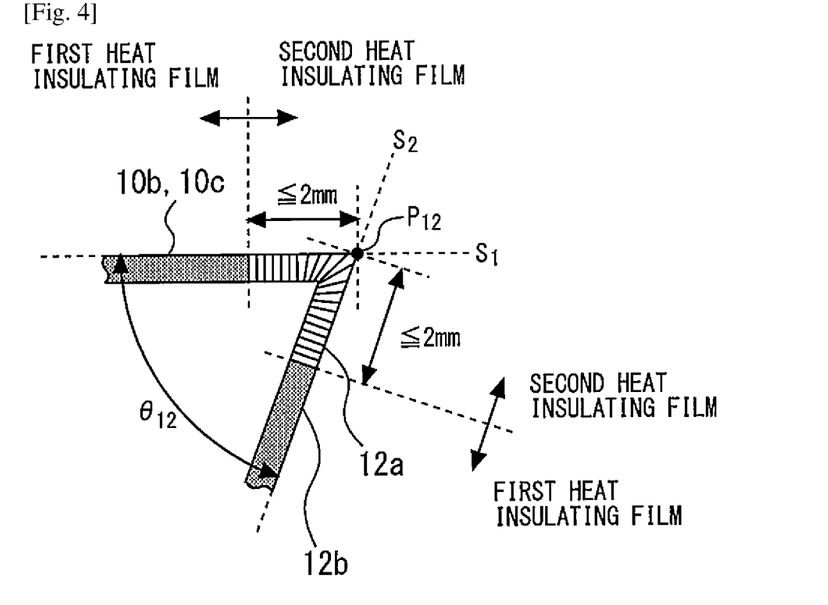
FIG. 4 is an enlarged schematic view of the edge portion 12a in FIG. 2.

FIG. 4 is an enlarged schematic view of the edge portion 12a in FIG. 2. The second heat insulating film is formed on the edge portion 12a shown in FIG. 4. A film width in a piston top surface direction of the second heat insulating film which is formed on the edge portion 12a is 2 mm at the maximum from an end point $P_{12}$. A film width in a cavity direction of the second heat insulating film is similar and is 2 mm at the maximum from the end point $P_{12}$. Further, an angle (an edge angle) $\theta_{12}$ formed by a dashed line $S_1$ and a dashed line $S_2$ satisfies $0°<\theta_{12}≤90°$. Here, the dashed line $S_1$ is a section line of a virtual surface formed by extension of a surface (that is, the piston top surface 10b or the piston top surface 10d) at a piston top surface 10 side adjacent to the edge portion 12a. The dashed line $S_2$ is a section line of a virtual surface formed by extension of a surface (that is, the cavity side surface 12b) at a cavity 12 side adjacent to the edge portion 12a.

Figure 5:
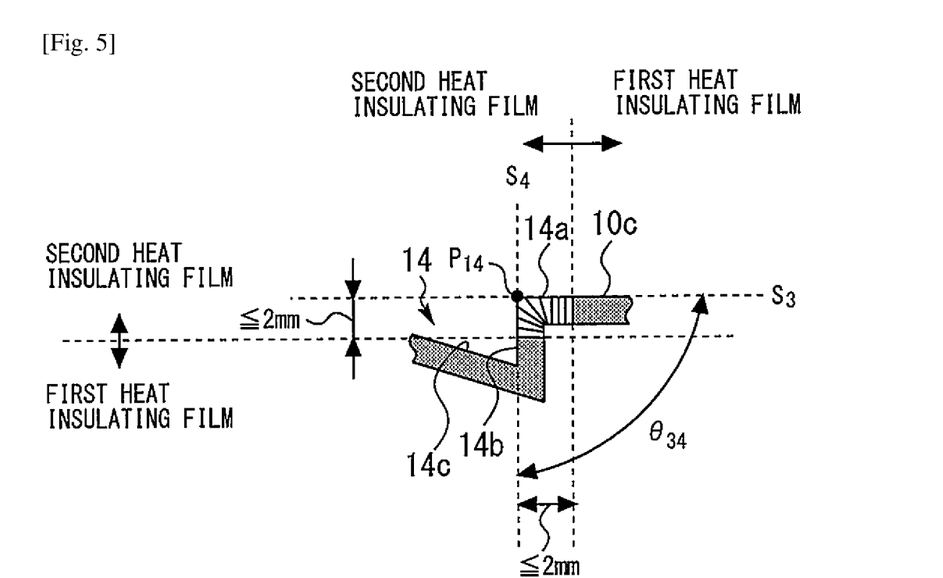
FIG. 5 is an enlarged schematic view of the edge portion 14a in FIG. 2.

FIG. 5 is an enlarged schematic view of the edge portion 14a in FIG. 2. The second heat insulating film is formed on the edge portion 14a shown in FIG. 5. A film width in a piston top surface direction of the second heat insulating film which is formed on the edge portion 14a is 2 mm at the maximum from an end point $P_{14}$ of the edge portion 14a. A film width in a valve recess direction of the second heat insulating film is similar, and is 2 mm at the maximum from the end point $P_{14}$. Further, an angle (an edge angle) $\theta_{34}$ formed by a dashed line $S_3$ and a dashed line $S_4$ satisfied $0°<\theta_{34}≤90°$. Here, the dashed line $S_3$ is a section line of a virtual surface formed by extension of a surface (that is, the piston top surface 10c) at a piston top surface 10 side adjacent to the edge portion 14a. The dashed line $S_4$ is a section line of a virtual surface formed by extension of a surface (that is, the valve recess side surface 14b) at a valve recess 14 side adjacent to the edge portion 14a.

Figure 6:
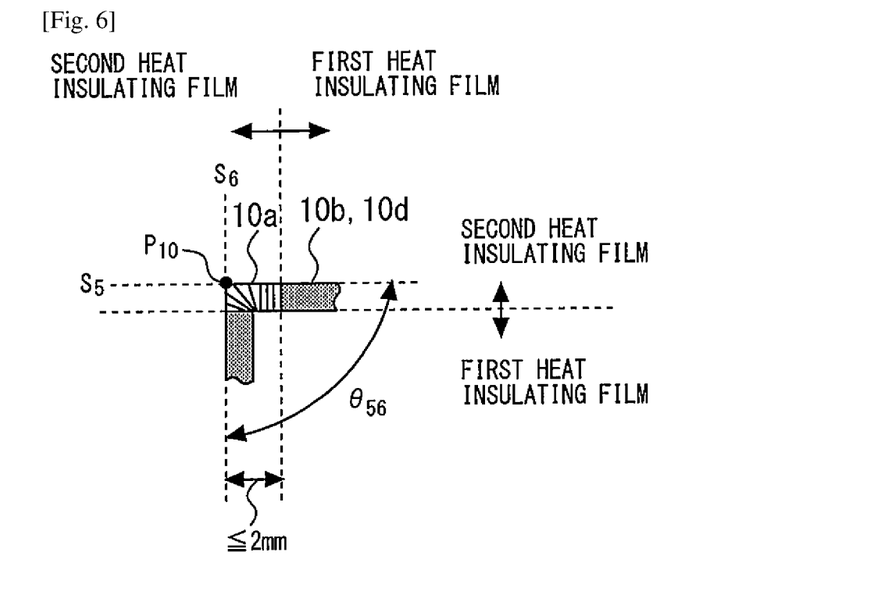
FIG. 6 is an enlarged schematic view of the edge portion 10a in FIG. 2.

FIG. 6 is an enlarged schematic view of the edge portion 10a in FIG. 2. The second heat insulating film is formed on the edge portion 10a shown in FIG. 6. The second heat insulating film is formed in only the piston top surface direction. A film width in the piston top surface direction of the second heat insulating film is 2 mm at the maximum from an end point $P_{10}$ of the edge portion 10a. Further, an angle (an edge angle)$\theta_{56}$ formed by a dashed line $S_5$ and a dashed line $S_6$ satisfied $90°≤\theta_{56}<180°$. Here, the dashed line $S_5$ is a section line of a virtual surface formed by extension of a surface (that is, the piston top surface 10b or the piston top surface 10d) at a piston top surface 10 side adjacent to the edge portion 10a. The dashed line $S_6$ is a section line of a virtual surface formed by extension of a piston side surface adjacent to the edge portion 10a.

Figure 7:
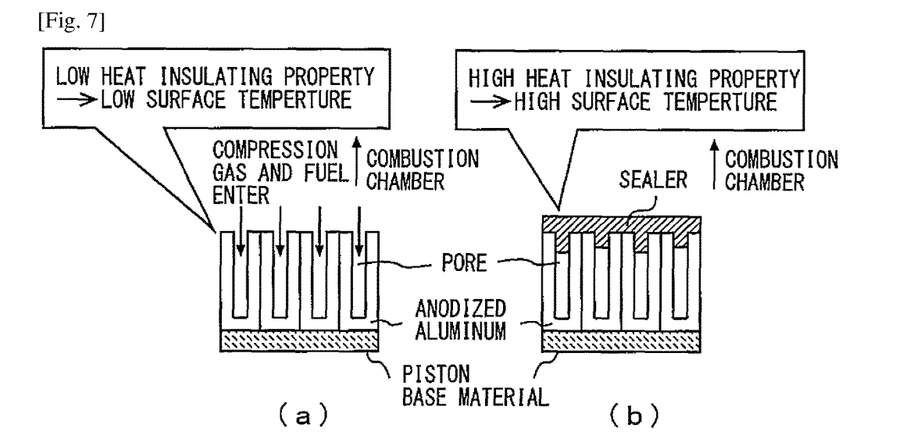
FIG. 7 is a view for explaining a difference in a coating film structure depending on presence or absence of the sealer.

A difference between the first heat insulating film and the second heat insulating film will be described with reference to FIG. 7. In the present embodiment, the second heat insulating film is composed of anodized aluminum. Meanwhile, the first heat insulating film is composed of anodized aluminum and a sealer. The anodized aluminum is a coating film (a film thickness of about 100 to 500 mm) of porous alumina formed on the piston top surface 10 by anodizing of the piston top surface 10. The porous alumina has a thermal conductivity lower than a thermal conductivity of an aluminum alloy that is a piston base material, and has a heat capacity lower than a heat capacity per unit volume of an aluminum alloy. The sealer is a coating film (a film thickness of about 5 to 50 mm) that has a silicon oxide (for example, polysilazane or polysilazane) as a main component, and is formed on a surface of the porous aluminum.

The difference between the first heat insulating film and the second heat insulating film lies in presence or absence of the sealer. FIG. 7 is a view for explaining a difference in a coating film structure depending on presence or absence of the sealer. FIG. 7 (a) shows a coating film structure without using the sealer, and FIG. 7(b) shows a coating film structure using the sealer. As shown in FIG. 7, anodized aluminum has a plurality of pores opened to a surface thereof, and the sealer is provided in such a manner as to cover openings of the pores. Here, the sealer having a silicon oxide as the main component has a thermal conductivity lower than the thermal conductivity of an aluminum alloy similarly to the porous alumina. Accordingly, the coating film structures in FIGS. 7(a) and 7(b) both show high heat insulating properties. However, in the coating film structure in FIG. 7(a), compression gas and injection fuel can enter the pores, and therefore, the heat insulating property of the coating film structure in FIG. 7(a) is lower as compared with the coating film in FIG. 7(b). That is to say, the coating film structure in FIG. 7(a) is a structure in which heat generated in the combustion chamber escapes to the aluminum base material side more easily as compared with the coating film structure in FIG. 7(b).

Figure 8:
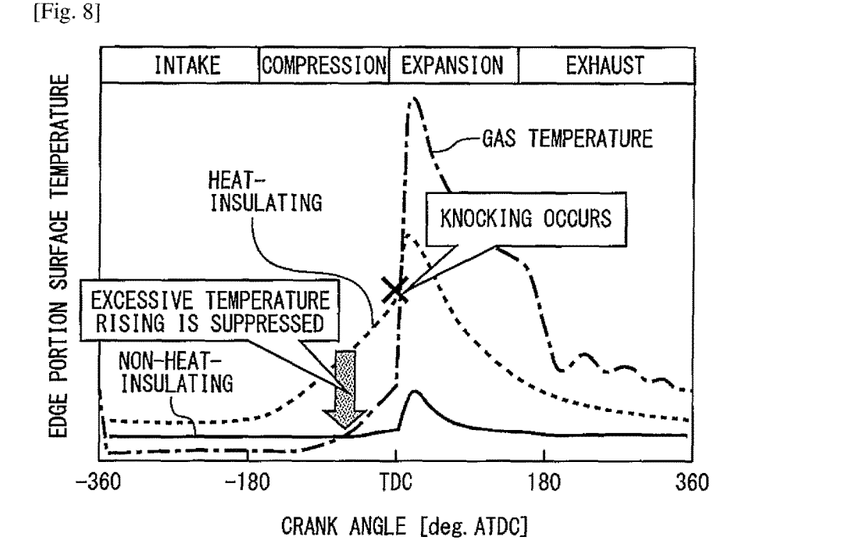
FIG. 8 is a diagram showing transitions of a surface temperature of the edge portion and a gas temperature in the combustion chamber in a combustion cycle.

An effect by the piston of the present embodiment will be described with reference to FIG. 8. FIG. 8 is a diagram showing transitions of a surface temperature of the edge portion and a gas temperature in the combustion chamber in a combustion cycle. A "GAS TEMPERATURE" shown by the alternate long and short dash line in FIG. 8 shows a transition of the gas temperature in the combustion chamber. A "NON-HEAT-INSULATING" shown by the solid line in FIG. 8 shows a transition of the surface temperature of the edge portion of the piston of the present embodiment. A "HEAT-INSULATING" shown by the dashed line in FIG. 8 shows a transition of a surface temperature of an edge portion of a comparison piston in which the first heat insulating film is formed on the entire piston top surface.

As shown in FIG. 8, the gas temperature abruptly rises by ignition in a vicinity of TDC to reach a peak. Following the rise in the gas temperature, the surface temperature of the edge portion also rises. However, in the heat insulating case, the surface temperature of the edge portion is already increased before the ignition timing. The reason thereof is that a heat spot is generated in the edge portion. Generation of a heat spot in the edge portion is caused by the structure of the edge portion, and the high heat insulating property of the first heat insulating film described with FIG. 7. If a heat spot is generated in the edge portion, knocking with the vicinity of the edge portion as an ignition point easily occurs. In this regard, the surface temperature of the edge portion before the ignition timing can be decreased in the non-insulating case of heat. The reason thereof is due to the coating film structure of the second heat insulating film described with FIG. 7.

As above, according to the piston of the present embodiment, the heat insulating property in the combustion chamber can be enhanced by the first heat insulating film formed on the piston top surface 10. Further, by the second heat insulating film formed on the edge portion, the surface temperature of the edge portion in which a heat spot is easily generated can be restrained from excessively rising before the ignition timing.

[Manufacturing method of piston] A manufacturing method of the piston of the present embodiment will be described with reference to FIG. 9. The manufacturing method of the piston of the present embodiment includes a step of forming anodized aluminum by anodizing the top surface of the piston of an aluminum alloy (an anodizing step) and a step of forming the sealer by sealing the surface of anodized aluminum (a sealing step).

FIG. 9(a) shows an anodizing step. In the anodizing step, a processing apparatus including a channel in which an electrolytic solution is caused to flow, and a pair of electrodes is used. The piston is placed in the processing apparatus, and electrolysis is performed by applying a voltage across the pair of electrodes while the electrolytic solution is caused to flow in the channel, whereby anodized aluminum is formed on the piston top surface. A porosity of the anodized aluminum is regulated to a desired value by an application voltage, and a film thickness of the anodized aluminum is regulated to a desired value by an application time period. Note that an anodizing method like this is already known, and therefore, more detailed explanation than the above will be omitted.

FIGS. 9(b) and (c) show the sealing step. In the sealing step, the edge portion is sealed first, and thereafter, a surface of the anodized aluminum is impregnated with a silicon polymer solution (polysiloxane, polysilazane or the like) to be a raw material of a silicon oxide. An impregnation method is not specially limited, and a method of spraying a solution to the surface of anodized aluminum, a blade coat method, a spin coat method, a brush coating method or the like can be applied. Subsequently, the surface of anodized aluminum is heated to a high temperature to dry/bake the silicon polymer solution. Conditions during high temperature heating (a temperature, a time period and the like) are properly regulated in accordance with an impregnation thickness of the silicon polymer solution. Finally, the seal at the edge portion is removed. By going through the above steps, the piston of the present embodiment can be produced.

Note that in the above described embodiment, the first heat insulating film corresponds to "a high heat insulation film" of the above described first invention. The second heat insulating film corresponds to "a low heat insulation film" of the above described first invention. The edge portion 12a corresponds to "a cavity edge portion" of the same invention. The cavity side surface 12b and the cavity bottom surface 12c correspond to "a surface inward from the cavity edge portion" of the same invention. The piston top surfaces 10b and 10b correspond to "a surface surround the cavity edge portion" of the same invention.

Further, the edge portion 10a corresponds to "a piston edge portion" of the above described second invention.

Further, the edge portion 14a corresponds to "a valve recess edge portion" of the above described fourth invention, and the valve recess side surface 14b and the valve recess bottom surface 14c correspond to "a surface inward from the valve recess edge portion" of the same invention, respectively.

Figure 10:
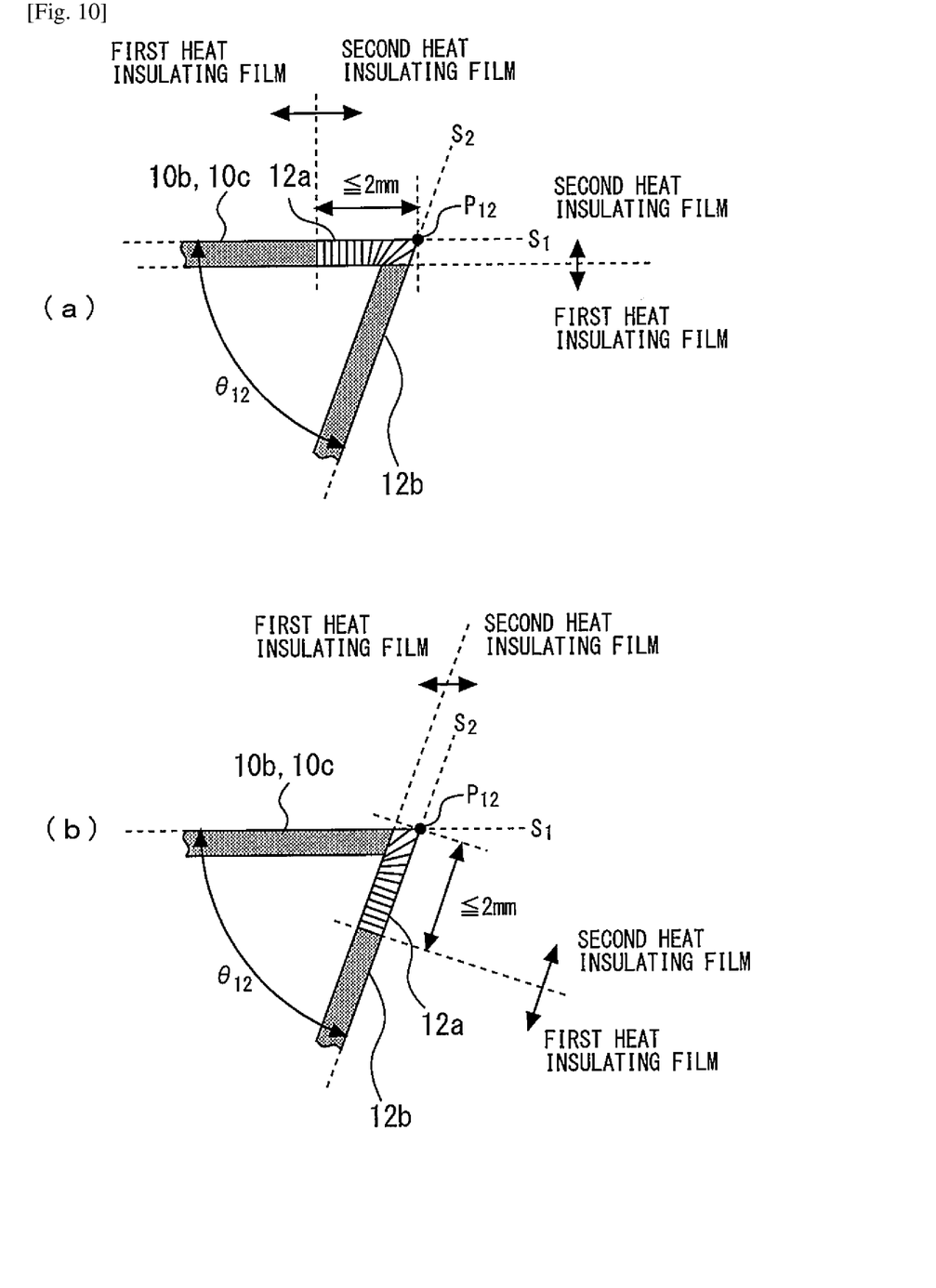
FIG. 10 is a view for explaining other examples of formation of the second heat insulating film.

[Other piston structures] Incidentally, in the above described embodiment, the second heat insulating film is formed in both of the piston top surface direction and the cavity direction of the edge portion 12a as described with FIG. 4. However, the second heat insulating film may be formed in either one of the piston top surface direction and the cavity direction. FIG. 10 is a view for explaining other examples of formation of the second heat insulating film. As shown in FIG. 10(a), the second heat insulating film may be formed only in the piston top surface direction of the edge portion 12a, and the first heat insulating film may be formed in the cavity direction of the edge portion 12a. As shown in FIG. 10(b), the second heat insulating film may be formed only in the cavity direction of the edge portion 12a, and the first heat insulating film may be formed in the piston top surface direction of the edge portion 12a.

Further, in the above described embodiment, the second heat insulating film is formed in both the piston top surface direction and the valve recess direction of the edge portion 14a, as described in explanation of FIG. 5. However, the second heat insulating film may be formed in only the piston top surface direction of the edge portion 14a, and the first heat insulating film may be formed in the valve recess direction of the edge portion 14a. Further, the second heat insulating film may be formed in only the valve recess direction of the edge portion 14a, and the first heat insulating film may be formed in the piston top surface direction of the edge portion 14a.

Further, in the above described embodiment, the second heat insulating film is formed on the edge portions. However, the second heat insulating film may be formed on the edge portions 12a and 14a, and the first heat insulating film may be formed on the edge portion 10a. As described on the occasion of explanation of FIG. 4 to FIG. 6, the edge angle $\theta_{56}$ ($90°\le\theta_{56}<180°$) is equal to or larger than the edge angles $\theta_{12}$ and $\theta_{34}$ ($0°<\theta_{12}, \theta_{34}\le90°$). That is to say, the edge portion 10a has a gentler slope as compared with the edge portions 12a and 14a, and has a structure in which a heat spot is difficult to generate as compared with the edge portions 12a and 14a. Accordingly, even when the first heat insulating film is formed on the edge portion 10a, if the second heat insulating film is formed on the edge portions 12a and 14a, an effect similar to the effect of the above described embodiment can be obtained.

Further, in the above described embodiment, the valve recesses 14 are provided to be recessed in the piston top surface 10, but the valve recesses 14 do not have to be provided to be recessed. In this case, if the second heat insulating film is formed on the edge portions 10a and 12a, and the first heat insulating film is formed on the piston top surface 10 except for the edge portions 10a and 12a, an effect similar to the effect of the above described embodiment can be obtained.

Further, in the above described embodiment, the valve recesses 14 are provided to be recessed on the piston top surface 10, and a valve recess that avoids interference with the intake valve (not illustrated) may be further provided to be recessed, in addition to the valve recesses 14. In this case, if the second heat insulating film is formed on the edge portion of the valve recess, an effect similar to the effect of the above described embodiment can be obtained.

Figure 9:
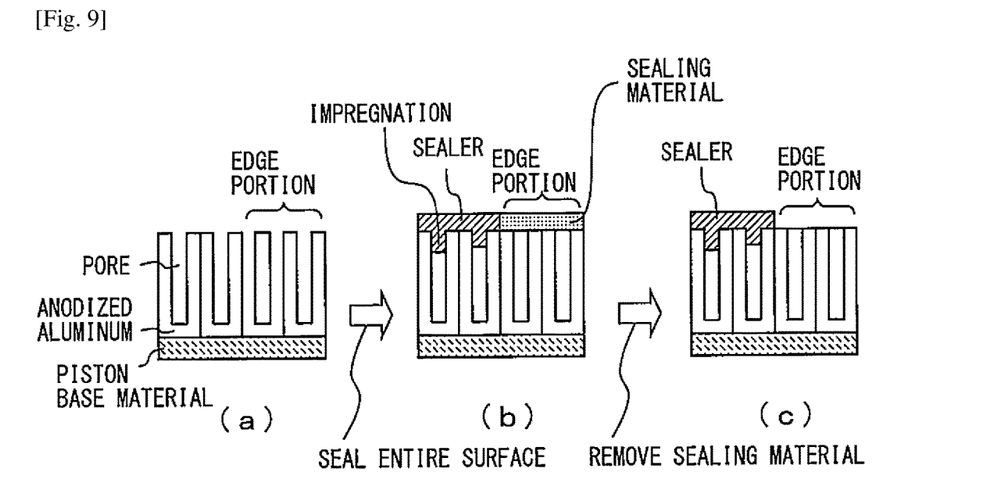
FIG. 9 is a view for explaining a manufacturing method of a piston for an internal combustion engine of the present embodiment.
Figure 11:
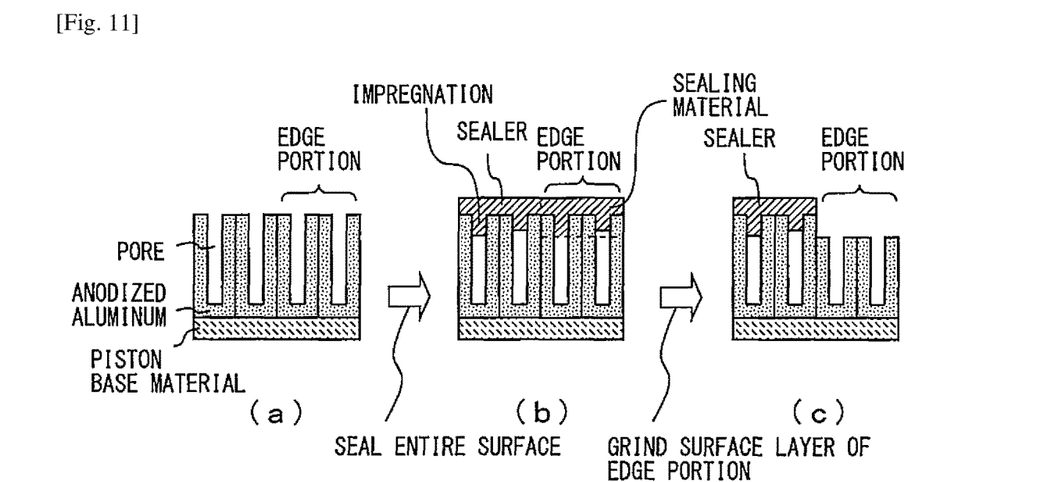
FIG. 11 is a view for explaining other manufacturing method of a piston for an internal combustion engine of the present embodiment.

Further, in the above described embodiment, the piston is produced according to the method described with FIG. 9. However, the piston can be also produced according to a method shown in FIG. 11. The production method shown in FIG. 11 includes a grinding step of grinding the sealer, in addition to the anodizing step and the sealing step which are described above. FIG. 11(a) shows the anodizing step. The anodizing step is similar to the step in FIG. 9(a). FIG. 11(b) shows the sealing step. In the sealing step, sealing for the edge portion is not performed, but a sealer is provided on the surface of the anodized aluminum, unlike the sealing step in FIG. 9(b). FIG. 11(c) shows the grinding step. In the grinding step, anodized aluminum is exposed by grinding a periphery of a spot provided with the sealer. By going through the above steps, a piston similar to the piston of the present embodiment can be produced.

Figure 12:
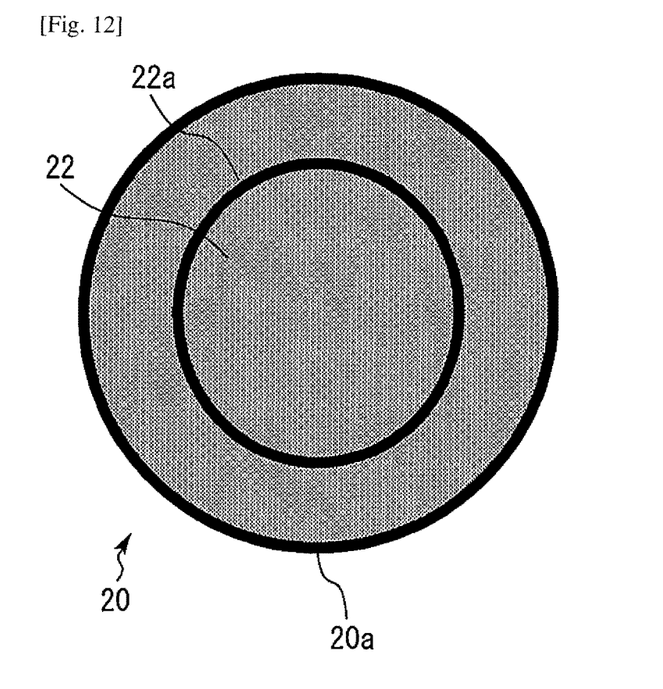
FIG. 12 is a schematic view of a top surface of a piston of a compression ignition type internal combustion engine.

Further, the above described embodiment is predicated on the spark ignition type internal combustion engine including an ignition plug, but the piston of the present invention can be also applied to a compression ignition type internal combustion engine. FIG. 12 is a schematic view of a top surface of a piston of a compression ignition type internal combustion engine. As shown in FIG. 12, a cavity 22 is formed in a center portion of a piston top surface 20. The first heat insulating film is formed on the piston top surface 20. However, the second heat insulating film is formed on an edge portion 20a of the piston top surface 20 and an edge portion 22a of the cavity 22. According to the second heat insulating film formed on the edge portions 20a and 22a, occurrence of pre-ignition caused by generation of heat spots in the edge portions 20a and 22a can be restrained.

That is to say, an effect similar to the effect of the above described embodiment can be obtained.

REFERENCE SIGNS LIST 10, 20 piston top surface
12, 22 cavity
14 valve recess
10a, 12a, 14a, 20a, 22a edge portion

The invention claimed is:

1. A piston for an internal combustion engine comprising a piston main body, a cavity formed on a top surface of the piston main body, and a heat insulating film that is formed on the top surface, and has a lower thermal conductivity and a lower heat capacity per unit volume than an aluminum alloy that is used as a base material of the piston main body, wherein the heat insulating film comprises a low heat insulation film that is formed on a cavity edge portion forming a boundary between the cavity and the top surface and is composed of alumina having a number of pores that are opened to the top surface, and a high heat insulation film that is formed on a surface inward from the cavity edge portion and a surface surrounding the cavity edge portion, and is composed of alumina having a number of pores that are opened to the top surface and a sealer that is provided to cover the openings of the number of pores.

2. The piston for an internal combustion engine according to claim 1, wherein the low heat insulation film is formed on a piston edge portion forming an edge of the top surface, and between the piston edge portion and the cavity edge portion, a surface surrounding the cavity edge portion is formed.

3. The piston for an internal combustion engine according to claim 1, wherein an edge angle θ of the cavity edge portion satisfies 0°<θ≤90°.

4. The piston for an internal combustion engine according to claim 1, further comprising:

a valve recess that is formed in the surface surrounding the cavity edge portion, wherein the low heat insulation film is formed on a valve recess edge portion corresponding to a circular arc portion in a boundary between the surface surrounding the cavity edge portion and the valve recess, and the high heat insulation film is formed on a surface inward from the valve recess edge portion.

5. The piston for an internal combustion engine according to claim 4, wherein an edge angle θ of the valve recess edge portion satisfies 0°<θ≤90°.

* * * * *